US011985366B2

(12) United States Patent
Barton

(10) Patent No.: US 11,985,366 B2
(45) Date of Patent: May 14, 2024

(54) INTERRUPTING PRESENTATION OF CONTENT DATA TO PRESENT ADDITIONAL CONTENT IN RESPONSE TO REACHING A TIMEPOINT RELATING TO THE CONTENT DATA AND NOTIFYING A SERVER

(71) Applicant: TiVo Solutions Inc., San Jose, CA (US)

(72) Inventor: James M. Barton, Los Gatos, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 18/227,802

(22) Filed: Jul. 28, 2023

(65) Prior Publication Data

US 2023/0379512 A1    Nov. 23, 2023

Related U.S. Application Data

(63) Continuation of application No. 17/730,929, filed on Apr. 27, 2022, now Pat. No. 11,778,248, which is a
(Continued)

(51) Int. Cl.
*H04N 21/234* (2011.01)
*G06F 1/3203* (2019.01)
(Continued)

(52) U.S. Cl.
CPC ..... *H04N 21/23424* (2013.01); *G06F 1/3203* (2013.01); *G06Q 30/02* (2013.01);
(Continued)

(58) Field of Classification Search
CPC .......... H04N 21/812; H04N 21/23424; H04N 21/435; H04N 21/4622; H04N 21/4331;
(Continued)

(56) References Cited

U.S. PATENT DOCUMENTS 5,973,685 A   10/1999  Schaffa et al.
6,141,447 A   10/2000  Linzer et al.
(Continued)

FOREIGN PATENT DOCUMENTS

CN    1349719 A    5/2002
CN    1623153 A    6/2005
(Continued)

OTHER PUBLICATIONS

"Pegasus Movie to Portable", PC Fan, Mynavi Corporation, dated May 1, 2006, vol. 13, No. 11 p. 128.
(Continued)

*Primary Examiner* — Cynthia M Fogg
(74) *Attorney, Agent, or Firm* — HALEY GUILIANO LLP

(57) ABSTRACT

System for present content. The system includes means for receiving a set of timepoints relating to a content data and means for generating display signals based on the content data. The system also includes means for sending display signals to a display device that represent the content data and means for notifying a server over the Internet, that a timepoint among the set of timepoints has been reached in the content data. The system also includes means for receiving, from the server, via the Internet, an identification of one or more particular additional content and in response to receiving the identification of the one or more particular additional content from the server, means for interrupting presentation of the content data; and presenting the one or more particular additional content. The system further includes means for resuming, presentation of the content data after presenting the one or more particular additional content.

18 Claims, 3 Drawing Sheets

Related U.S. Application Data continuation of application No. 17/565,849, filed on Dec. 30, 2021, now Pat. No. 11,350,141, which is a continuation of application No. 17/138,546, filed on Dec. 30, 2020, now Pat. No. 11,343,546, which is a continuation of application No. 16/509,326, filed on Jul. 11, 2019, now Pat. No. 11,070,853, which is a continuation of application No. 16/102,206, filed on Aug. 13, 2018, now Pat. No. 11,778,245, which is a continuation of application No. 15/413,370, filed on Jan. 23, 2017, now Pat. No. 10,051,296, which is a continuation of application No. 14/748,121, filed on Jun. 23, 2015, now Pat. No. 9,554,161, which is a continuation of application No. 14/265,258, filed on Apr. 29, 2014, now Pat. No. 9,064,271, which is a continuation of application No. 13/747,414, filed on Jan. 22, 2013, now Pat. No. 8,713,599, which is a continuation of application No. 12/191,261, filed on Aug. 13, 2008, now Pat. No. 8,359,612.

(51) Int. Cl.
| | |
|---|---|
| *G06Q 30/02* | (2023.01) |
| *G06Q 30/0241* | (2023.01) |
| *G06Q 30/0251* | (2023.01) |
| *H04L 67/02* | (2022.01) |
| *H04L 67/10* | (2022.01) |
| *H04N 21/235* | (2011.01) |
| *H04N 21/262* | (2011.01) |
| *H04N 21/414* | (2011.01) |
| *H04N 21/436* | (2011.01) |
| *H04N 21/4363* | (2011.01) |
| *H04N 21/44* | (2011.01) |
| *H04N 21/61* | (2011.01) |
| *H04N 21/81* | (2011.01) |
| *H04N 21/8547* | (2011.01) |
| *H04N 21/858* | (2011.01) |

(52) U.S. Cl.
CPC ..... *G06Q 30/0241* (2013.01); *G06Q 30/0251* (2013.01); *G06Q 30/0277* (2013.01); *H04L 67/02* (2013.01); *H04L 67/10* (2013.01); *H04N 21/235* (2013.01); *H04N 21/26241* (2013.01); *H04N 21/41407* (2013.01); *H04N 21/43615* (2013.01); *H04N 21/43635* (2013.01); *H04N 21/44016* (2013.01); *H04N 21/6125* (2013.01); *H04N 21/6175* (2013.01); *H04N 21/812* (2013.01); *H04N 21/8547* (2013.01); *H04N 21/8586* (2013.01)

(58) Field of Classification Search
CPC ............. H04N 21/235; H04N 21/4722; H04N 21/4316; H04N 21/44016; H04N 21/8547; H04N 21/8586; H04N 21/26241; H04N 21/41407; H04N 21/43615; H04N 21/43635; H04N 21/6125; H04N 21/6175
USPC ........................................................ 725/32
See application file for complete search history.

(56) References Cited

U.S. PATENT DOCUMENTS

| | | |
|---|---|---|
| 6,181,746 B1 | 1/2001 | Hoshi |
| 6,407,680 B1 | 6/2002 | Lai et al. |
| 6,950,623 B2 | 9/2005 | Brown et al. |
| 6,981,045 B1 | 12/2005 | Brooks |
| 7,456,760 B2 | 11/2008 | Normile et al. |
| 7,523,214 B2 | 4/2009 | Kikkawa et al. |
| 7,568,209 B1 | 7/2009 | Addington et al. |
| 7,734,116 B2 | 6/2010 | Panabaker et al. |
| 8,234,158 B1 | 7/2012 | Sun et al. |
| 9,064,271 B2 | 6/2015 | Barton |
| 9,100,702 B2 | 8/2015 | Barton |
| 9,554,093 B2 | 1/2017 | Hua et al. |
| 9,697,536 B2 | 7/2017 | Arankalle et al. |
| 2001/0042249 A1 | 11/2001 | Knepper et al. |
| 2002/0026638 A1 | 2/2002 | Eldering et al. |
| 2002/0068525 A1 | 6/2002 | Brown et al. |
| 2002/0083439 A1 | 6/2002 | Eldering |
| 2002/0087978 A1 | 7/2002 | Nicholson et al. |
| 2002/0100043 A1 | 7/2002 | Lowthert et al. |
| 2002/0110370 A1 | 8/2002 | Nomura |
| 2002/0111956 A1 | 8/2002 | Yeo et al. |
| 2002/0120925 A1 | 8/2002 | Logan |
| 2002/0123928 A1 | 9/2002 | Eldering et al. |
| 2002/0129360 A1 | 9/2002 | Lee |
| 2002/0138831 A1 | 9/2002 | Wachtfogel et al. |
| 2002/0144262 A1 | 10/2002 | Plotnick et al. |
| 2002/0147985 A1 | 10/2002 | Miyajima et al. |
| 2002/0184047 A1 | 12/2002 | Plotnick et al. |
| 2003/0066084 A1 | 4/2003 | Kaars |
| 2003/0084444 A1 | 5/2003 | Ullman et al. |
| 2003/0088872 A1 | 5/2003 | Maissel et al. |
| 2003/0115597 A1 | 6/2003 | Yassin et al. |
| 2003/0120541 A1 | 6/2003 | Siann et al. |
| 2003/0139966 A1 | 7/2003 | Sirota et al. |
| 2003/0149618 A1 | 8/2003 | Sender et al. |
| 2003/0149975 A1 | 8/2003 | Eldering et al. |
| 2003/0149988 A1 | 8/2003 | Ellis et al. |
| 2004/0003397 A1 | 1/2004 | Boston et al. |
| 2004/0015608 A1 | 1/2004 | Ellis et al. |
| 2004/0051812 A1 | 3/2004 | Hayward |
| 2004/0073941 A1 | 4/2004 | Ludvig et al. |
| 2004/0148454 A1 | 7/2004 | Seo |
| 2004/0163107 A1 | 8/2004 | Crystal |
| 2004/0179825 A1 | 9/2004 | Im |
| 2004/0244035 A1 | 12/2004 | Wright et al. |
| 2004/0268387 A1 | 12/2004 | Wendling |
| 2004/0268413 A1 | 12/2004 | Reid et al. |
| 2005/0010950 A1 | 1/2005 | Carney et al. |
| 2005/0074063 A1 | 4/2005 | Nair et al. |
| 2005/0076359 A1 | 4/2005 | Barton et al. |
| 2005/0081252 A1 | 4/2005 | Chefalas et al. |
| 2005/0086703 A1 | 4/2005 | Gupta et al. |
| 2005/0177421 A1 | 8/2005 | Fujimoto |
| 2005/0210101 A1 | 9/2005 | Janik |
| 2005/0215238 A1 | 9/2005 | Macaluso |
| 2005/0246451 A1 | 11/2005 | Silverman et al. |
| 2005/0251820 A1 | 11/2005 | Stefanik et al. |
| 2005/0289588 A1 | 12/2005 | Kinnear |
| 2006/0029364 A1 | 2/2006 | Kosugi |
| 2006/0041902 A1 | 2/2006 | Zigmond |
| 2006/0064734 A1 | 3/2006 | Ma |
| 2006/0088279 A1 | 4/2006 | Tsunashima et al. |
| 2006/0095472 A1 | 5/2006 | Krikorian et al. |
| 2006/0100928 A1 | 5/2006 | Walczak et al. |
| 2006/0161947 A1 | 7/2006 | Laksono et al. |
| 2006/0212897 A1 | 9/2006 | Li et al. |
| 2006/0223593 A1 | 10/2006 | Ishak |
| 2006/0242016 A1 | 10/2006 | Chenard |
| 2006/0245725 A1 | 11/2006 | Lim |
| 2006/0259938 A1 | 11/2006 | Kinoshita et al. |
| 2007/0055983 A1 | 3/2007 | Schiller et al. |
| 2007/0094081 A1 | 4/2007 | Yruski et al. |
| 2007/0094083 A1 | 4/2007 | Yruski et al. |
| 2007/0100690 A1 | 5/2007 | Hopkins |
| 2007/0118425 A1 | 5/2007 | Yruski et al. |
| 2007/0157249 A1 | 7/2007 | Cordray et al. |
| 2007/0192789 A1 | 8/2007 | Medford |
| 2007/0220024 A1 | 9/2007 | Putterman et al. |
| 2007/0283384 A1 | 12/2007 | Haeuser et al. |
| 2007/0300261 A1 | 12/2007 | Barton et al. |
| 2008/0004952 A1 | 1/2008 | Koli |
| 2008/0004954 A1 | 1/2008 | Horvitz |
| 2008/0010117 A1 | 1/2008 | Oliveira et al. |
| 2008/0013622 A1 | 1/2008 | Bao et al. |

(56) References Cited

U.S. PATENT DOCUMENTS

| | | |
|---|---|---|
| 2008/0015932 A1 | 1/2008 | Haeuser et al. |
| 2008/0046919 A1 | 2/2008 | Carmi et al. |
| 2008/0056673 A1 | 3/2008 | Morris |
| 2008/0059631 A1 | 3/2008 | Bergstrom et al. |
| 2008/0060002 A1 | 3/2008 | Noll et al. |
| 2008/0062018 A1 | 3/2008 | Normile et al. |
| 2008/0092168 A1 | 4/2008 | Logan et al. |
| 2008/0092182 A1 | 4/2008 | Conant |
| 2008/0109298 A1 | 5/2008 | Barton |
| 2008/0114861 A1 | 5/2008 | Gildred |
| 2008/0118227 A1 | 5/2008 | Barton |
| 2008/0127245 A1* | 5/2008 | Olds ............... H04N 21/64322 725/32 |
| 2008/0127249 A1 | 5/2008 | Cruice |
| 2008/0172293 A1 | 7/2008 | Raskin et al. |
| 2008/0276266 A1 | 11/2008 | Huchital et al. |
| 2008/0310408 A1 | 12/2008 | Thompson et al. |
| 2008/0313669 A1 | 12/2008 | Acharya et al. |
| 2009/0006191 A1 | 1/2009 | Arankalle et al. |
| 2009/0025026 A1 | 1/2009 | Mick et al. |
| 2009/0100468 A1 | 4/2009 | Shaffer et al. |
| 2009/0135901 A1 | 5/2009 | Au et al. |
| 2009/0148125 A1 | 6/2009 | Watson et al. |
| 2009/0180534 A1 | 7/2009 | Hluchyj et al. |
| 2009/0193456 A1 | 7/2009 | Ahn et al. |
| 2009/0199236 A1 | 8/2009 | Barrett et al. |
| 2009/0265214 A1 | 10/2009 | Jobs et al. |
| 2009/0307732 A1 | 12/2009 | Cohen et al. |
| 2010/0042499 A1 | 2/2010 | Barton |
| 2010/0042749 A1 | 2/2010 | Barton |
| 2010/0151782 A1 | 6/2010 | Sato et al. |
| 2012/0110618 A1 | 5/2012 | Kilar et al. |
| 2013/0132171 A1 | 5/2013 | Barton |
| 2013/0227621 A1 | 8/2013 | Barton |
| 2014/0236712 A1 | 8/2014 | Barton |
| 2015/0245111 A1 | 8/2015 | Berry et al. |
| 2015/0296256 A1 | 10/2015 | Barton |
| 2015/0382055 A1 | 12/2015 | Dua |
| 2019/0141365 A1 | 5/2019 | Barton |
| 2021/0120287 A1 | 4/2021 | Barton |
| 2021/0120288 A1 | 4/2021 | Barton |
| 2022/0124390 A1 | 4/2022 | Barton |
| 2022/0124391 A1 | 4/2022 | Barton |
| 2022/0124392 A1 | 4/2022 | Barton |
| 2022/0329885 A1 | 10/2022 | Barton |

FOREIGN PATENT DOCUMENTS

| | | |
|---|---|---|
| CN | 1852410 A | 10/2006 |
| CN | 101466024 A | 6/2009 |
| EP | 1199890 A2 | 4/2002 |
| EP | 1363215 A1 | 11/2003 |
| JP | 2001285777 A | 10/2001 |
| JP | 2002218403 A | 8/2002 |
| JP | 2002322218 A | 11/2002 |
| JP | 2003125098 A | 4/2003 |
| JP | 2004102339 A | 4/2004 |
| JP | 2004526227 A | 8/2004 |
| JP | 2005513617 A | 5/2005 |
| JP | 2006146804 A | 6/2006 |
| JP | 2007013667 A | 1/2007 |
| JP | 2007133628 A | 5/2007 |
| JP | 2007159072 A | 6/2007 |
| JP | 2007226382 A | 9/2007 |
| JP | 2008102174 A | 5/2008 |
| WO | 9956473 A1 | 11/1999 |
| WO | 0191474 A2 | 11/2001 |
| WO | 0241199 A2 | 5/2002 |
| WO | 0243385 A2 | 5/2002 |
| WO | 02082374 A2 | 10/2002 |
| WO | 03010965 A1 | 2/2003 |
| WO | 03058537 A1 | 7/2003 |
| WO | 03075569 A2 | 9/2003 |
| WO | 2005034503 A2 | 4/2005 |
| WO | 2005059676 A2 | 6/2005 |
| WO | 2005062975 A2 | 7/2005 |
| WO | 2007082190 A2 | 7/2007 |
| WO | 2008002309 A2 | 1/2008 |
| WO | 2008054802 A2 | 5/2008 |

OTHER PUBLICATIONS

Arciniegas, "A Realist's SMIL Manifesto," Retrieved from the Internet: URL:https://web.archive.org/web/20080723090723/http://www/xml.com/lpt/a/976 [retrieved on Jun. 28, 2023).

Downloading Whatever Flash Content You Want, PC Japan, Softbank Creative Corp., dated Feb. 1, 2006, vol. 11, No. 2, pp. 36 and 37.

Full Customization of Firefox, Mac People, ASCII Corp., dated Mar. 1, 2006, vol. 12, No. 3, pp. 140-145.

Hugo E. Martin on Media, Marketing & Internet: Google InVideo Ad Format on You Tube, Aug. 22, 2007, http://google-invideo-ad-format-on-you-tube.html, printed Mar. 4, 2009, 12 pages.

Jing Deng et , "Local Web advertisement through dynamic active proxy," 2000 IEEE International Conference on Multimedia and Expo. ICME2000. Proceedings. Latest Advances in the Fast Changing World of Multimedia, 2000, pp. 1183-1186 vol. 2.

Wan, et al., "Advertising Insertion in Sports Webcasts", K.Wan and X. Yan, "Advertising Insertion in Sports Webcasts," In IEEE MultiMedia, vol. 14, No. 2, pp. 78-82, Apr.-Jun. 2007, doi:10.119/MMUL.2007.26. (Year: 2007), Apr.-Jun. 2007, 78-82.

U.S. Appl. No. 12/191,261, filed Aug. 13, 2008, James M. Barton.
U.S. Appl. No. 13/747,414, filed Jan. 22, 2013, James M. Barton.
U.S. Appl. No. 14/265,258, filed Apr. 29, 2014, James M. Barton.
U.S. Appl. No. 14/748,121, filed Jun. 23, 2015, James M. Barton.
U.S. Appl. No. 15/413,370, filed Jan. 23, 2017, James M. Barton.
U.S. Appl. No. 16/102,206, filed Aug. 13, 2018, James M. Barton.
U.S. Appl. No. 16/509,326, filed Jul. 11, 2019, James M. Barton.
U.S. Appl. No. 17/138,531, filed Dec. 30, 2020, James M. Barton.
U.S. Appl. No. 17/138,546, filed Dec. 30, 2020, James M. Barton.
U.S. Appl. No. 17/565,841, filed Dec. 30, 2021, James M. Barton.
U.S. Appl. No. 17/565,845, filed Dec. 30, 2021, James M. Barton.
U.S. Appl. No. 17/565,849, filed Dec. 30, 2021, James M. Barton.
U.S. Appl. No. 17/730,929, filed Apr. 27, 2022, James M. Barton.

* cited by examiner

INTERRUPTING PRESENTATION OF CONTENT DATA TO PRESENT ADDITIONAL CONTENT IN RESPONSE TO REACHING A TIMEPOINT RELATING TO THE CONTENT DATA AND NOTIFYING A SERVER

CROSS REFERENCE TO RELATED APPLICATIONS

This application claims benefit as a continuation of U.S. patent application Ser. No. 17/730,929, filed Apr. 27, 2022 (now allowed), which claims benefit as a continuation of U.S. patent application Ser. No. 17/565,849, filed Dec. 30, 2021, now U.S. Pat. No. 11,350,141, which claims benefit as a continuation of U.S. patent application Ser. No. 17/138, 546, filed Dec. 30, 2020, now U.S. Pat. No. 11,343,546, which claims benefit as a continuation of U.S. Ser. No. 16/509,326, filed Jul. 11, 2019, now U.S. Pat. No. 11,070, 853, which claims benefit as a continuation of U.S. patent application Ser. No. 16/102,206, filed Aug. 13, 2018, which claims benefit as a continuation of U.S. patent application Ser. No. 15/413,370, filed Jan. 23, 2017, now U.S. Pat. No. 10,051,296, which claims benefit as a continuation of U.S. patent application Ser. No. 14/748,121, filed Jun. 23, 2015, now U.S. Pat. No. 9,554,161, which claims benefit as a continuation of U.S. patent application Ser. No. 14/265,258, filed Apr. 29, 2014, now U.S. Pat. No. 9,064,271, which claims benefit as a continuation of U.S. patent application Ser. No. 13/747,414, filed Jan. 22, 2013, now U.S. Pat. No. 8,713,599, which claims benefit as a continuation of U.S. patent application Ser. No. 12/191,261, filed Aug. 13, 2008, now U.S. Pat. No. 8,359,612, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

Aspects of the present invention relate to (a) the distribution of content (e.g., audiovisual media content) from various sources to people using transportable memory devices and also to (b) techniques for deriving revenue in connection with the distribution of such content using such devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An abundance of digitized audio and video content is accessible through various sites on the Internet using a browser application such as Mozilla Firefox. A user can direct his browser application to the uniform resource locator (URL) of a web site and click on a link to view a movie or listen to music. If the user wishes to view the movie or listen to the music at a later time, the user can instruct his browser application to download the data to which the link refers. In response, the browser application downloads the data and stores the data on the hard disk drive of the user's computer.

Usually, such data is stored in a compressed and encoded form. Often, audiovisual content downloaded over the Internet is encoded in conformity with a Motion Picture Experts Group (MPEG) standard. Although computers usually have applications that can uncompress and decode such content for presentation to a user, other more traditional content-presenting devices, such as televisions, usually do not have any mechanisms for translating such content into a form that those devices can present to a user.

Sometimes, a user might want to view, on a television, content that the user has downloaded to his computer. If the computer has the proper interface, then the user might be able to connect the computer to the television. The computer might be equipped with an application that can read the content from the computer's hard disk drive, uncompress and decode that content into a form that is presentable by the television, and send the content in such a form to the television through the interface.

However, computers are not easily carried from one location to another. Computers are often relatively large and heavy. Laptop computers are generally smaller and lighter in weight than desktop computers, but still consume a significant quantity of electricity in order to power the hard disk drive on which downloaded content is stored. Although a user might want to view downloaded content on several different televisions at several different locations, the user might be reluctant, due to the size and weight of his computer, to cart his computer around from location to location. Furthermore, computers (especially laptop computers) are quite expensive. Many people do not have the financial means to purchase laptop computers. The average person might be reluctant to purchase a laptop computer unless that person has a need for the laptop computer beyond merely viewing movies and listening to music that the person downloaded over the Internet.

Additionally, because there are so many web sites from which content can be obtained, users might be unaware of the vast majority of content that the users could obtain. If a user is looking for content that relates to a particular topic, the user might try entering, into an Internet search engine, query terms that relate to that topic. Often, though, the results that an Internet search engine returns will exclude references to content of which the search engine is unaware.

Thus, despite the vast amount of content that is stored on various servers throughout the Internet, people do not have an effective and inexpensive way of finding and viewing that content, especially when those people are highly mobile.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
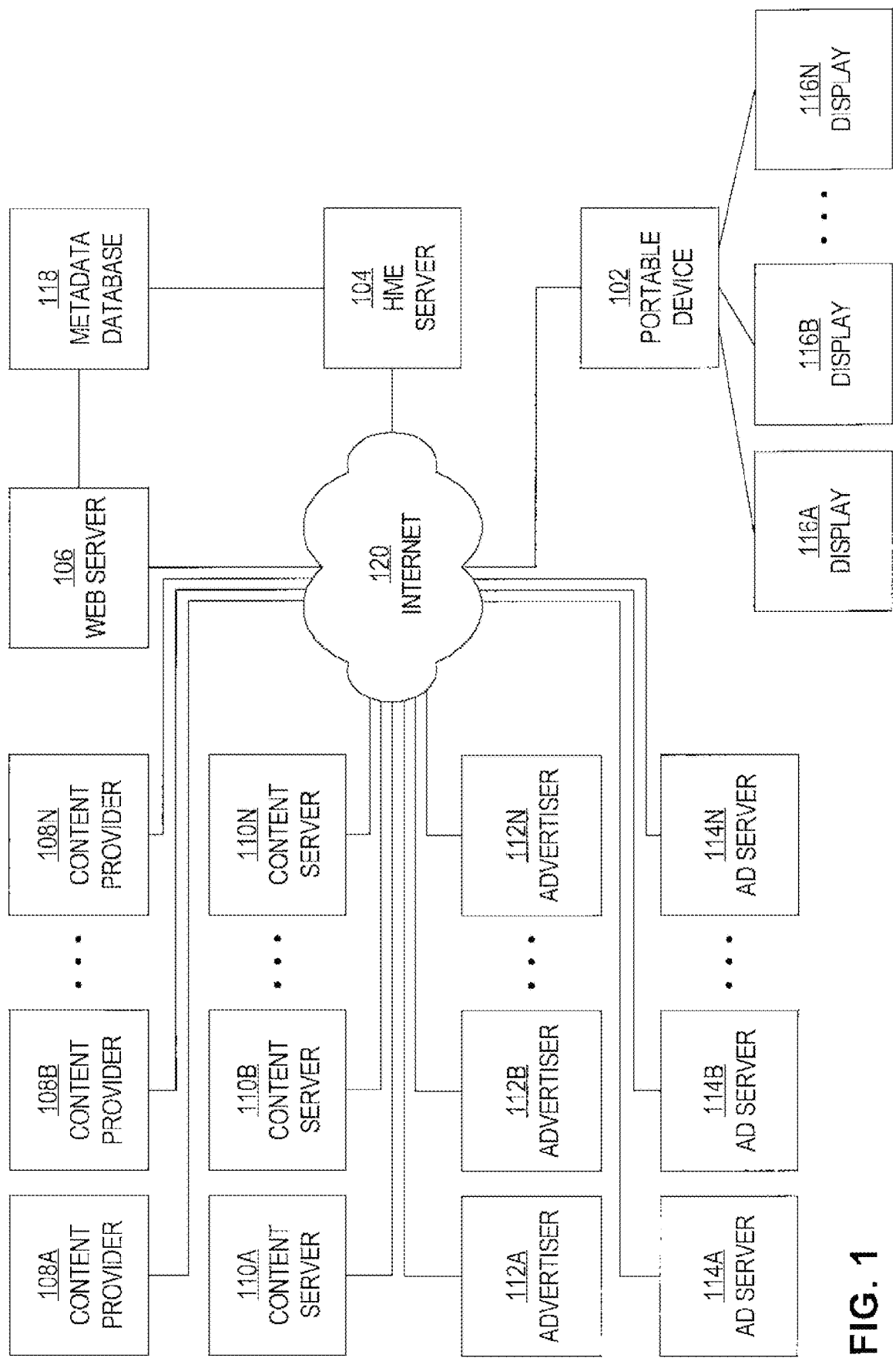
FIG. 1 is a block diagram that illustrates a system for distributing content to a person through a transportable device, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 Overview
2.0 Example Content Distribution System
3.0 Automatic Advertisement Matching
4.0 Bid-Based Advertisement Selection
5.0 Example Advertisement Presentation Techniques
6.0 Example Techniques for Deriving Revenue from the Content Distribution System
7.0 Implementation Mechanisms—Hardware Overview 1.0 Overview According to one embodiment of the invention, a portable device downloads (or has streamed to it) content (e.g., audiovisual media content) over the Internet from various remote content sources. In one embodiment of the invention, the portable device comprises a storage mechanism for persistently storing the content on the portable device as the portable device receives the content. The portable device additionally comprises a communication mechanism for (a) communicating with the remote content sources via the Internet and/or other networks and (b) streaming the content from the storage mechanism to a presentation device such as a television or monitor. The presentation device plays the received content to a person via a visual display and/or audio speakers.

In one embodiment of the invention, the portable device contains an Ethernet interface and/or a wireless network interface through which the portable device communicates with the remote content sources. In one embodiment of the invention, the portable device contains a high-definition multimedia interface (HDMI) or other interface through which the portable device sends content to the presentation device. In one embodiment of the invention, the portable device contains solid-state memory (e.g., FLASH memory, Compact Flash (CF) cards, SD and SDHC cards, USB memory sticks, and so forth) onto which the portable device persistently stores the content that the portable device receives from the remote content sources. In one embodiment of the invention, the portable device is small enough and lightweight enough to fit into and be carried in a person's pocket.

According to certain embodiments of the invention, after the portable device's user has caused the portable device to stream portable device-stored content to one presentation device at one location, the portable device's user can carry the portable device to another presentation device at another location. The portable device's owner can then cause the portable device to stream the portable device-stored content to the other presentation device at the latter location. Thus, according to certain embodiments of the invention, the portable device can be used in conjunction with multiple different presentation devices at different locations at different times.

Embodiments of the invention summarized above are described below in greater detail, along with some alternative embodiments of the invention.

2.0 Example Content Distribution System

FIG. 1 is a block diagram that illustrates a system for distributing content to a person through a transportable device, according to one embodiment of the invention. The system comprises portable device 102, home media engine (HME) server 104, web server 106, content providers 108A-N, content servers 110A-N, advertisers 112A-N, ad servers 114A-N, displays 116A-N, metadata database 118, and Internet 120. The example system shown in FIG. 1 is but one of many possible different alternative embodiments of the invention; alternative embodiments of the invention may be implemented in alternative systems with fewer, greater, or different components than those illustrated in FIG. 1. Displays 116A-N may include televisions, monitors, and other kinds of displays that are capable of presenting motion video.

Each of content providers 108A-N is a separate person or organization. In one embodiment of the invention, each of content providers 108A-N creates and/or owns different content items. As used herein, the term "content item" refers to any kind of media content. A content item may be audiovisual media such as a movie or television program. A content item may be motion video content without audio. A content item may be audio without any video; for example, a content item may be music. A content item may be a single-frame still image. A content item may be a computer-executable application; for example, a content item may be a video game. Each of content providers 108A-N has a computer through which that content provider communicates with other components of the system (especially web server 106) through Internet 120.

Content providers 108A-N store content on content servers 110A-N. For example, each of content servers 110A-N may be a computer with a remote or local hard disk drive on which one or more content items are persistently stored. In one embodiment of the invention, various ones of content servers 110A-N are owned and operated by various ones of content providers 108A-N. In an alternative embodiment of the invention, content servers 110A-N are owned and operated by entities other than content providers 108A-N. Content servers 110A-N are configured to communicate with other components of the system through Internet 120. In one embodiment of the invention, content providers 108A-N store content items on content servers 110A-N by sending those content items through Internet 120. Each of content servers 110A-N may be associated with a separate Internet domain name. Each content item that is stored on one of content servers 110A-N may be associated with a unique uniform resource locator (URL) that identifies both the content item and the content server on which that content item is stored.

Each of advertisers 112A-N is a separate person or organization. In one embodiment of the invention, each of advertisers 112A-N creates and/or owns different advertisements. Advertisements may be in the form of still images, audio, and/or motion audiovisual media. Advertisements may be in the form of interactive offers which a person can accept or reject; for example, an offer might invite a person to purchase a particular merchandise item; if the person chooses to purchase the merchandise item, then the offer may cause an entity to ship the merchandise item to the person's address. Additionally or alternatively, advertisements may be in the form of games and/or other interactive forms. Each of advertisers 112A-N has a computer through which that advertiser communicates with other components of the system (especially web server 106) through Internet 120.

Advertisers 112A-N store advertisements on ad servers 114A-N. For example, each of ad servers 114A-N may be a computer with a hard disk drive on which one or more advertisements are persistently stored. In one embodiment of the invention, various ones of ad servers 114A-N are owned and operated by various ones of advertisers 112A-N. In an alternative embodiment of the invention, ad servers 114A-N are owned and operated by entities other than advertisers 114A-N. Ad servers 114A-N are configured to communicate with other components of the system through Internet 120. In one embodiment of the invention, advertisers 112A-N store advertisements on ad servers 114A-N by sending those advertisements through Internet 120. Each of ad servers 114A-N may be associated with a separate Internet domain name. Each advertisement that is stored on one of ad servers 114A-N may be associated with a unique uniform resource locator (URL) that identifies both the advertisement and the ad server on which that advertisement is stored.

Content providers 108A-N and advertisers 112A-N interact with web server 106 via Internet 120. Web server 106 serves, to the computers of content providers 108A-N and advertisers 112A-N, web pages that contain user interfaces. Content providers 108A-N and advertisers 112A-N submit information to web server 106 through these user interfaces.

Content providers 108A-N submit, to web server 106, information that indicates the URLs of various content items that are stored on content servers 110A-N. With each such URL, content providers 108A-N may submit metadata that describes various aspects (e.g., title, year, director, actors, rating, abstract, etc.) of the content item with which that URL is associated. For each URL, the metadata submitted in conjunction with that URL may indicate one or more content keywords that are chosen by the content provider that submitted that metadata. The content keywords are used to match advertisements with content items in an automatic manner that is discussed in greater detail below. In response to receiving the above information from content providers 108A-N, web server 106 stores the information in metadata database 118. Web server 106 establishes, in metadata database 118, associations between content item URLs and the metadata (including the content keywords) that was submitted with those content item URLs.

Advertisers 112A-N submit, to web server 106, information that indicates the URLs of various advertisements that are stored on ad servers 114A-N. With each such URL, advertisers 112A-N may submit metadata that describes various aspects of the advertisement with which that URL is associated. For each URL, the metadata submitted in conjunction with that URL may indicate one or more ad keywords that are chosen by the advertiser that submitted that metadata. The ad keywords are used to match advertisements with content items in an automatic manner that is discussed in greater detail below. In response to receiving the above information from advertisers 112A-N, web server 106 stores the information in metadata database 118. Web server 106 establishes, in metadata database 118, associations between advertisement URLs and the metadata (including the ad keywords) that was submitted with those advertisement URLs.

Portable device 102 contains an interface through which portable device 102 can communicate with other components of the system via Internet 120. For example, portable device 102 may contain an Ethernet interface and/or a wireless network interface. Portable device 102 also contains an HDMI through which portable device 102 can send television signals to any of displays 116A-N; each of displays 116A-N also has an HDMI to which portable device 102 can be connected. Displays 116A-N may sit at different locations; for example, display 116A might be located in one house, while display 116B might be located in another house. The person who carries portable device 102 may choose the particular one of displays 116A-N to which that person currently wants portable device 102 to be connected. For example, portable device 102 may be connected to a television or monitor that has an HDMI.

Portable device 102 receives user interface commands that HME server 104 sends to portable device 102 through Internet 120. The user interface commands may conform to a specified remote display protocol, for example. In response to receiving user interface commands from HME server 104, portable device 102 sends, to a particular television (the one of displays 116A-N to which portable device 102 is currently connected) television signals that cause the particular television to display user interface elements that correspond to the user interface commands. Portable device 102 also receives, in wireless signals from a remote control held by the viewer of the particular television, user commands that correspond to the viewer's selection of certain user interface elements. Each user command triggers a corresponding event. Portable device 102 notifies HME server 104 of the occurrence of each such event via Internet 120. In response to the occurrences of various events, HME server 104 may send various corresponding sets of user interface commands to portable device 102. Thus, a viewer's selection (through the remote control) of a user interface element may cause HME server 104 to instruct portable device 102 to cause the particular television to display a different user interface than the user interface that the particular television currently displays.

HME server 104 queries the information in metadata database 118 to determine a set of content items that are stored on content servers 110A-N. Based on the query results, HME server 104 generates a set of user interface commands that will cause portable device 102 to generate television signals that represent a content guide. The content guide identifies the set of content items that are stored on content servers 110A-N. For example, the content guide might include a sorted and/or filtered (based on specified criteria) list of content items. HME server 102 sends the set of user interface commands to portable device 102 over Internet 120. In response to receiving the set of user interface commands, portable device 102 generates television signals that represent the content guide. Portable device 102 sends these television signals to the particular one of displays 116A-N to which portable device 102 is currently connected. In response, the particular television displays the content guide.

A viewer's selection (through the remote control) of a particular content item displayed in the content guide causes portable device 102 to notify HME server 104 of the occurrence of the event that corresponds to the selection of the particular content item. In the notification, portable device 102 identifies the particular content item that was selected. In one embodiment of the invention, HME server 104 receives the notification and, in response, sends the URL of the particular content item (as indicated in the associations stored in metadata database 118) to portable device 102. Portable device 102 sends, over Internet 120, to the particular one of content servers 110A-N that is associated with the URL, a request for the particular content item (also identified by the URL). The particular content server receives the request and, in response, sends the particular content item over Internet 120 to portable device 102. Thus, portable device 102 downloads the particular content item from the particular content server. Although portable device 102 downloads the content item in one embodiment of the invention, in an alternative embodiment of the invention, the particular content server streams the content item to the portable device 102.

In one embodiment of the invention, in response to receiving the particular content item, portable device 102 stores the particular content item within solid-state memory (e.g., FLASH memory, Compact Flash (CF) cards, SD and SDHC cards, USB memory sticks, and so forth) that is contained in portable device 102. In one embodiment of the invention, HME server 104 instructs portable device 102 to play the particular content item. In response, portable device 102 generates, and sends to the particular television, television signals that cause the particular television to present (e.g., play and/or display) the particular content item. The particular television presents the particular content item that is represented in the television signals.

As is discussed above, in one embodiment of the invention, HME server 104 sends the URL of a selected content item to portable device 102 in response to a user's selection of that content item. However, in an alternative embodiment of the invention, HME server 104 may send multiple URLs for multiple content items to portable device 102, and even prior to the user of portable device 102 selecting any particular content item. For example, HME server 104 may send, to portable device 102, the URL for each content item that is contained in the content guide discussed above (and, possibly, even URLs for content items that are not contained in the content guide), even before a user selects any particular content item from the content guide. Portable device 102 may store such received URLs for later use when the user actually does select a content item that corresponds to one of those URLs.

Content items may be stored on content servers 110A-N in a compressed and encoded form. For example, content items may be stored in conformity with a Motion Picture Experts Group (MPEG) standard. Therefore, in one embodiment of the invention, portable device 102 decodes and decompresses the compressed and encoded content item when portable device 102 generates the television signals that portable device 102 will send to the particular television to cause the particular television to present that content item. The content item may remain in compressed and encoded form within the solid-state memory (e.g., FLASH memory, Compact Flash (CF) cards, SD and SDHC cards, USB memory sticks, and so forth) of portable device 102 in order to conserve memory.

3.0 Automatic Advertisement Matching

As is discussed above, in one embodiment of the invention, advertisers 112A-N store advertisements on ad servers 114A-N. Also as is discussed above, in one embodiment of the invention, advertisers 112A-N submit, to web server 106, information that associates (a) the URLs for these advertisements with (b) metadata for these advertisements. Web server 106 stores, in metadata database 118, associations between the advertisement URLs and the advertisement metadata. As is discussed above, in one embodiment of the invention, the metadata for the advertisements includes one or more ad keywords that may pertain to the content or subject of the advertisement. For example, the ad keywords might indicate a product type, a service type, and/or a brand name.

In one embodiment of the invention, when HME server 104 detects the occurrence of an event that indicates that the user of portable device 102 has selected a content item from the content guide, HME server 104 queries metadata database 118 to determine the content keywords that are associated with the selected content item. HME server 104 then queries metadata database 118 to determine a set of matching advertisements. HME server 104 determines the set of matching advertisements by finding advertisements that are associated, in metadata database 118, with at least one ad keyword that matches at least one content keyword that is associated, in metadata database 118, with the selected content item. Keywords can be single words; alternatively, keywords can be phrases that include multiple related words. For example, if the selected content item is associated with the content keyword "Zippy Cola" then HME server 104 may query metadata database 118 to determine a set of advertisement URLs that are each associated with the ad keyword "Zippy Cola."

In one embodiment of the invention, after HME server 104 has determined the set of matching advertisement URLs, HME server 104 sends (over Internet 120) one or more of the matching advertisement URLs to portable device 102 along with the URL of the selected content item. Some example techniques by which HME server 104 may select from among the matching advertisement URLs are described in greater detail below. In one embodiment of the invention, portable device 102 receives the advertisement URLs and, in response, downloads (over Internet 120), from the appropriate ones of ad servers 114A-N, the advertisements that are associated with those advertisement URLs. Such advertisements may, alternatively, be streamed to portable device 102 from the appropriate ones of ad servers 114A-N. In one embodiment of the invention, portable device 102 plays or displays (via the particular one of displays 116A-N to which portable device 102 is currently connected) the downloaded advertisements before, after, and/or during the interval during which portable device 102 plays or displays the selected content item. The advertisement URLs do not need to be sent to portable device 102 exactly at the time that the advertisement is to be downloaded by portable device 102. In one embodiment of the invention, portable device 102 can pre-fetch content that portable device 102 might need later. For example, in one embodiment of the invention, portable device 102 receives, along with the URL of a user-selected content item, several advertisement URLs that are associated with the URL of the user-selected content item. Portable device 102 may receive the advertisements located at the advertisement URLs concurrently with receiving the user-selected content item. Portable device 102 may store such advertisements for later display at appropriate time intervals relative to the presentation of the content item—for example, immediately after the presentation of the content item has ended.

In one embodiment of the invention, HME server 104 instructs portable device 102 to obtain content (e.g., content items and/or advertisements) and cache that content for possible later presentation. Portable device 102 may cache some content that portable device 102 never actually presents to a user. HME server 104 may manage the content cache of portable device 102 remotely, choosing which content will be placed in the cache and which content will be evicted from the cache when the cache becomes full. The determination, by HME server 104, of which content will be cached by portable device 102, may be based on information that is related to the use of portable device 102 and/or the user of portable device 102. For example, HME server 104 may choose content to be cached on a particular portable device based on a content viewing history of the user of that particular portable device. HME server 104 may maintain such a content viewing history using information that portable device 102 sends to HME server 104 in response to the user's viewing of content.

In one embodiment of the invention, whenever portable device 102 presents an advertisement through a connected television, portable device 102 sends, to HME server 104, a notification that indicates (a) the identity of that advertisement (e.g., the advertisement URL) and (b) that the advertisement was presented. Portable device 102 may decode and/or uncompress downloaded advertisements in order to generate the television signals that will cause displays 116A-N to display those advertisements. Some example techniques by which portable device 120 plays or displays downloaded advertisements are discussed further below.

4.0 Bid-Based Advertisement Selection

As is discussed above, in one embodiment of the invention, HME server 104 automatically determines a set of matching advertisements for a selected content item. In some cases, the number of matching advertisements might be large—too large for all of the matching advertisements to be displayed or played in conjunction with the content item in a reasonable amount of time. Under such circumstances, HME server 104 may select one or more advertisements from among the matching advertisements based on amounts of fees that advertisers 112A-N are willing to pay for the presentation of those advertisements.

In one embodiment of the invention, when advertisers 112A-N submit advertisement metadata to web server 106, the advertisers also submit bids for the presentation of the associated advertisements. Web server 106 stores these bids within the advertisement metadata that web server 106 stores in metadata database 118. For example, advertiser 112A might submit, to web server 106, information that indicates that advertiser 112A is willing to pay the operator of a service (e.g., TiVo Inc.) a specified amount of money each time that a particular advertisement is presented (e.g., to the user of portable device 102 or other similar portable devices).

In one embodiment of the invention, after determining the set of matching advertisements in the manner described above, HME server 104 determines a number of advertisement slots that are available for the selected content item; in one embodiment of the invention, this number is chosen by a content provider and is indicated in the content metadata that is associated with the selected content item. HME server 104 sorts the matching advertisements based on the bid amounts that are associated with those matching advertisements. HME server 104 then selects, from the matching advertisements that are associated with the highest bid amounts, a number of matching advertisements that is equal to the number of available advertisement slots. HME server 104 sends the URLs for the selected matching advertisements to portable device 102 over Internet 120. Using these URLs, portable device 102 downloads the selected matching advertisements from the appropriate ones of ad servers 114A-N and presents the selected matching advertisements in conjunction with the selected content item.

In one embodiment of the invention, HME server 104 instructs portable device 102 to obtain and cache advertisements even before the user of portable device 102 has selected any content item. More specifically, in one embodiment of the invention, HME server 104 periodically selects, from among all available advertisements, a limited subset of the advertisements that are currently associated with the highest bids. HME server 104 periodically instructs portable device 102 to obtain these selected advertisements and cache them in the storage of portable device 102 for later possible use and presentation (e.g., in the event that the user actually does, later, select a content item in conjunction with which one of these advertisements should be presented). Thus, portable device 102 may obtain (e.g., via downloading or streaming technology) advertisements that are currently associated with the highest bids, even though the user of portable device 102 might never select a content item that would require one of those advertisements to be presented, and even though at least some of those advertisements might never be presented, and might eventually be evicted from the cache (e.g., if other advertisements end up receiving higher bids). In one embodiment of the invention, HME server 104 not only selects, for "proactive caching" by portable device 102, advertisements associated with the highest bids, but also advertisements that, based on the user's past viewing history and content item selection, are likely to end up being presented. Thus, in one embodiment of the invention, HME server 104 determines a weight for each available advertisement based on some combination of (a) how that advertisement's current bid ranks among current bids associated with other advertisements and (b) the probability, based on the user's known content item viewing habits, that the advertisement actually will end up being presented to the user. HME server 104 then instructs portable device 102 to cache, proactively, the advertisements that are associated with the most significant weights. HME server 104 may instruct portable device 102 to obtain and cache advertisements and other content at specified off-peak times of day (e.g., times of day at which portable device 102 is unlikely to be obtaining content items in response to the user's selection of those content items) so that the bandwidth of portable device 102 is not overused at time-sensitive moments.

A service provider who owns and/or operates HME server 104 might determine that certain "premium" content items are among those that a user of portable device 102 will want to view. Therefore, in one embodiment of the invention, the service provider causes (via HME server 104) portable device 102 to obtain and cache such likely-to-be-viewed content items. Under circumstances in which a "premium" content item is currently stored in the cache of portable device 102, but has not yet been presented, HME server 104 may instruct portable device 102 to present (in conjunction with another content item that portable device 102 is currently presenting to a user) advertisements that refer to the cached "premium" content item and that are specifically designed to entice the user to request the presentation of the cached "premium" content item. This helps to ensure that the cached "premium" content item actually will be requested by and presented to the user, so that the bandwidth and storage used to cache the "premium" content item will not have been used in vain. In one embodiment of the invention, a producer, owner, or distributor of a "premium" content item enters into an agreement with the service provider to pay the service provider some specified fee(s) in exchange for (a) the caching of the "premium" content item on portable device 102 and/or (b) the presentation of the special advertisements that promote the "premium" content item to the user of portable device 102. In one embodiment of the invention, the service provider does not enable the caching of the "premium" content item as discussed above until such an agreement between the service provider and the item's producer has been entered into.

In one embodiment of the invention, whenever HME server 104 sends an advertisement URL to portable device 102, or, alternatively, whenever HME server 104 receives a notification that portable device 102 presented an advertisement that is associated with such a URL, HME server 104 bills a bank account, invoice, or credit card that is associated with the one of advertisers 112A-N that placed the bid for that advertisement. HME server 104 bills the bank account, invoice, or credit card in the amount specified in the bid for that advertisement. In one embodiment of the invention, advertisers 112A-N submit bank account information and/or credit card information along with the bids that advertisers 112A-N submit through web server 106. In one embodiment of the invention, web server 106 stores such bank account information and/or credit card information in the advertisement metadata that is associated, in metadata database 118, with the related advertisement URL.

In an embodiment of the invention described above, bid amounts are associated with advertisement URLs. However, in an alternative embodiment of the invention, advertisers 112A-N submit bid amounts in association with advertiser-selected keywords rather than specific advertisements. Web server 106 stores, in metadata database 118, associations between ad keywords, bid amounts, and the identities of the advertisers who submitted those bid amounts. In such an alternative embodiment of the invention, HME server 104 may select, from among the set of matching advertisements, one or more advertisements that are associated with ad keywords that are associated with the highest bid amounts. Each advertisement may be associated with multiple different ad keywords.

5.0 Example Advertisement Presentation Techniques

There are numerous different ways in which portable device 102 can present downloaded advertisements in conjunction with the presentation of a content item. In one embodiment of the invention, portable device 102 presents one or more advertisements before presenting the content item. In one embodiment of the invention, portable device 102 presents one or more advertisements after presenting the content item. In one embodiment of the invention, portable device 102 presents one or more advertisements before presenting the content item, and then presents one or more advertisements after presenting the content item. For example, portable device 102 may play advertisements for five minutes preceding the presentation of the content item, and then portable device 102 may play advertisements for five minutes following the presentation of the content item.

In one embodiment of the invention, portable device 102 presents advertisements during the presentation of the content item. For example, in one embodiment of the invention, HME server 104 determines the height-width ratio of the content item before portable device 102 presents the content item. In such an embodiment of the invention, if HME server 104 determines that the height-width ratio of the content item in comparison to the height-width ratio of the television on which the content item is going to be presented will leave black strips above and below or to either side of the content item, then HME server 104 instructs portable device 102 to play or display advertisements in the display space that is not occupied by the content item. In response, portable device 102 plays or displays these advertisements concurrently with the presentation of the content item, but in the display space that is not occupied by the content item.

In one embodiment of the invention, portable device 102 presents advertisements at periodic interruptions in between the presentation of portions of the content item. For example, portable device may present 10 minutes of the content item, and then present one or more advertisements, and then present the next 10 minutes of the content item, and then present one or more advertisements, and then present the next 10 minutes of the content item.

In one embodiment of the invention, when one of content providers 108A-N submits information to web server 106 in conjunction with a content item, as discussed above, that content provider includes, in that information, an indication of one or more time points at which advertisements may be inserted. Web server 106 stores the one or more time points in the content metadata that is associated with the content item URL in metadata database 118. In such an embodiment of the invention, HME server 104 provides the list of time points to portable device 102 before portable device 102 presents the content item with which those time points are associated. According to one embodiment of the invention, when portable device 102 plays the content item up to one of the time points in the list, portable device 102 notifies HME server 104 that a time point has been reached. In response to this notification, HME server 104 instructs portable device 102 to play one or more advertisements before continuing to present the content item up to the next time point in the list. However, according to an alternative embodiment of the invention, instead of notifying HME server 104 that a time point has been reached, portable device 102 independently selects one or more advertisements to play before continuing to present the content item. Under such circumstances, portable device 102 may inform HME server 104 as to which advertisements portable device 102 has selected and presented (or is currently presenting). Portable device 102 may select advertisement URLs from a list of advertisement URLs that portable device 102 locally stores. Some such URLs may point to a advertisements that are already stored in a cache that portable device 102 maintains, while other such URLs may point to resources stored or maintained by various ones of ad servers 114A-N. Thus, in one alternative embodiment of the invention, the advertisement presentation by portable device 102 is entirely pre-computed and downloaded by portable device 102 along with the content that portable device 102 will play, with portable device 102 inserting advertisements into the presentation stream automatically, and with portable device 102 letting HME server 104 know about which advertisements portable 102 has presented as portable device 102 presents those advertisements.

In one embodiment of the invention, the content provider indicates to web server 106, in addition to the list of time points, the maximum amount of time during which the content provider will allow advertisements to be played at each time point. In such an embodiment of the invention, HME server 104 instructs portable device 102 to present, at each time point, advertisements whose lengths collectively do not exceed the specified maximum amount of time.

In one embodiment of the invention, the content provider indicates, to web server 106, a list of time points as discussed above, but also indicates, for each time point, one or more content keywords that are associated with that time point. For example, content provider 108A might associate the content keyword "soap" with a first time point (e.g., at the 5:00 mark) and the content keyword "beer" with a second time point (e.g., at the 10:00 mark). Content provider 108A may choose the content keywords that are to be associated with a particular time point based on the subject matter of the content item that will be presented at that time point. Continuing the above example, content provider 108A might choose "soap" to be associated with the first time point because the content item might be a television show in which, at the first time point, one of the actors is in the shower. Similarly, content provider 108A might choose "beer" to be associated with the second time point because, in the television show, one of the actors might drink from a bottle of beer at the second time point. In such an embodiment of the invention, when portable device 102 notifies HME server 104 that a particular time point has been reached in the presentation of the content item, HME server 104 determines one or more advertisements that are associated with an ad keyword that matches at least one content keyword that is associated with the particular time point in metadata database 118. HME server 104 instructs portable device 102 to present one or more of these advertisements in a non-obtrusive manner. For example, portable device 102 may cause the television to present a banner or overlay in a portion of the screen while the content item is playing; the banner or overlay may contain material from a matching advertisement. For another example, portable device 102 may cause the television to present, in the corner of the screen, an icon that indicates that additional information is available in response to the viewer's pushing of a particular button on the remote control; in response to the viewer's pushing of the particular button while the icon is being displayed, portable device 102 may cause the television to present the matching advertisement, temporarily interrupting the presentation of the content item. In each of the above examples, portable device 102 may perform the operations in response to instructions from HME server 104.

In one embodiment of the invention, the fee that a content service provider charges to an advertiser whose advertisements are displayed in the manner described above is based at least in part on when those advertisements are displayed during the program. For example, in one embodiment of the invention, the content service provider charges a highest fee for advertisements that are played during the beginning of the program, and charges a lowest fee for advertisements that are played during the ending of the program. For advertisements that are played between the beginning and the end of the program, the content service provider may charge a fee that is based on the ratio of (a) the amount of the program that has been played to (b) the amount of the program that remains to be played, such that a higher fee is charged for advertisements that are played towards the beginning of the program than for advertisements that are played towards the end of the program. HME server 104 may select, from among a plurality of advertisements with different associated fees, which advertisements to offer to the viewer based at least in part on the fees associated with the playing of those advertisements. For example, HME server 104 may select a set of advertisements that will generate a highest amount of fees while remaining within a specified number of advertisements or a specified amount of total advertising time during the program.

6.0 Example Techniques for Deriving Revenue from the Content Distribution System There are multiple different techniques by which an operator of a content distribution service (e.g., the owner and operator of web server 106 and/or the maintainer of the metadata in metadata database 118) can derive revenue from activities that occur within the content distribution system. As is discussed above, in one embodiment of the invention, advertisers 112A-N submit bids with the URLs of the advertisements that are stored on ad servers 114A-N. In such an embodiment of the invention, HME server 104 selects one of keyword-matching advertisements based on the bid amounts that are associated with those advertisements. The operator of the content distribution service (e.g., TiVo Inc.) obtains, from advertisers 112A-N, revenue in the amount of the bids that are associated with the advertisements that portable device 102 actually presents. Thus, in one embodiment of the invention, the content distribution service operator sells advertising opportunities to advertisers 112A-N using the online (via web server 106) bidding process described above.

In an alternative embodiment of the invention, the content distribution service operator offers to store the advertisements of advertisers 112A-N on a server that the content distribution service operator owns or operates. Advertisers 112A-N might find this prospect to be more appealing than storing the advertisements on their own ad servers (e.g., ad servers 114A-N). In one embodiment of the invention, in exchange for the privilege of storing advertisements on the content distribution service operator's server, advertisers 112A-N agree to pay the content distribution service operator a specified amount. For example, the content distribution service operator might charge advertiser 112A a specified monetary amount each month. The specified monetary amount might be based on the size (e.g., in bytes) of the advertisements that advertiser 112A is storing on the content distribution service operator's server, or, alternatively, based on the bandwidth consumed in delivering the advertisements to portable devices.

In one embodiment of the invention, at the time that content providers 108A-N submit content item URLs and associated metadata to web server 106, content providers 108A-N enter into a legally binding agreement with the content distribution service operator (e.g., by checking a box on a web page). The agreement specifies that the content provider gives permission for the content distribution service operator to sell advertising opportunities to advertisers 112A-N. The agreement additionally specifies that the content provider will receive a specified portion of the revenues obtained from advertisers 112A-N; the content distribution service operator will receive the rest of these revenues. Such an agreement functions as an inducement for content providers 108A-N to submit the URLs of their content items, and associated metadata, to web server 106.

Techniques discussed above are directed to obtaining revenue from advertisers 112A-N. Additionally or alternatively, techniques for obtaining revenue from content providers 108A-N may be employed as discussed below. In one embodiment of the invention, content providers 108A-N embed advertisements into their own content items that are stored on content servers 110A-N. In such an embodiment of the invention, those of content providers 108A-N that embed advertisements into their own content items enter into an agreement with the content distribution service operator. The agreement specifies that, in exchange for allowing the content provider to embed advertisements into the content items that portable device 102 will download (or otherwise receive, e.g., via streaming technology) and present, the content provider agrees to pay the content distribution service operator a specified monetary amount every time that portable device 102 (or a similar device) downloads and/or presents one of the content provider's content items. Thus, in such an embodiment of the invention, portable device 102 may notify HME server 104 each time that portable device 102 downloads (or otherwise receives, e.g., via streaming technology) and/or presents a content item. In response to receiving such a notification, HME server 104 bills a bank account, invoice, or credit card that is associated with the one of content providers 108A-N whose content item portable device 102 received and/or presented. HME server 104 bills the bank account, invoice, or credit card in the amount specified in the agreement with the content provider. In one embodiment of the invention, content providers 108A-N submit bank account information and/or credit card information along with the content item URLs that content providers 108A-N submit through web server 106. In one embodiment of the invention, web server 106 stores such bank account information, invoice, and/or credit card information in the content metadata that is associated, in metadata database 118, with the related content item URL. Thus, in one embodiment of the invention, content providers 108A-N, rather than the content distribution service operator, sell advertising opportunities to advertisers 112A-N, but the content distribution service operator derives revenue from content providers 108A-N in exchange for allowing content providers 108A-N to do so.

In one embodiment of the invention, the content provider embeds advertisements into content items, but also allows the content distribution service operator to sell some advertising opportunities to advertisers 112A-N. In one such embodiment of the invention, the content provider indicates (e.g., via web server 106), in the content metadata that is associated with the content item URL in metadata database 118, a set of time points at which HME server 104 may instruct portable device 102 to insert keyword-matching advertisements. The content provider may additionally specify a maximum time interval for each time point. In such an embodiment of the invention, HME server 104 instructs portable device 102 to present, at each time point, advertisements whose lengths collectively do not exceed the specified maximum amount of time. Thus, during the presentation of the content item, portable device 102 may present both (a) advertisements that the content provider previously embedded in the content item itself and (b) advertisements that HME server 104 automatically selected and instructed portable device 102 to download (using the keyword-matching technique discussed above).

In one embodiment of the invention, when content providers 108A-N submit content item URLs to web server 106, content providers 108A-N additionally specify whether the corresponding content items are "premium" content. Web server 106 stores, in the content metadata that is associated with a content item URL in metadata database 118, an indication of whether the corresponding content item is "premium" or not. In such an embodiment of the invention, content providers 108A-N additionally specify, for each "premium" content item, an amount that the operator of portable device 102 is to be billed whenever portable device 102 receives (e.g., downloads or receives via streaming) and/or presents that "premium" content item (the content distribution service operator may require a service subscription from each operator of a portable device in order for the device's operator to use that portable device; the content distribution service operator may maintain billing information for each such subscription). In such an embodiment of the invention, those of content providers 108A-N that submit "premium" content item URLs enter into an agreement with the content distribution service operator. The agreement specifies that the content distribution service operator will receive a specified portion of the amount that the operator of portable device 102 is billed when portable device 102 downloads and/or presents the "premium" content item. In such an embodiment of the invention, whenever portable device 102 downloads and/or presents a "premium" content item, HME server 104 bills a bank account, invoice, or credit card of the operator of portable device 102, directs the specified portion of the billed amount to the content distribution server operator, and pays the remainder of the billed amount to the content provider. In one embodiment of the invention, portable device 102 does not present any advertisements before, during, or after (or otherwise in conjunction with) the presentation of a "premium" content item for whose presentation the operator of portable device 102 paid money.

In one embodiment of the invention, the content distribution service operator derives revenue from content providers 108A-N by charging content providers 108A-N money in exchange for providing content providers 108A-N with the opportunity to control, temporarily and in a limited scope, portable device 102. As is discussed above, in one embodiment of the invention, portable device 102 receives user interface commands from HME server 104 and generates television signals or display signals based on those user interface commands. In one embodiment of the invention, in response to a user's selection of a particular content item from the content guide that portable device 102 presents, HME server 104 permits another server, owned by the content provider who submitted the particular content item, to send certain approved user interface commands to portable device 102 for a limited period of time (e.g., until portable device 102 receives a command to resume normal operation under the control of HME server 104). In one embodiment of the invention, unlike HME server 104, the content provider's server is not owned or operated by the content distribution service operator. Thus, in one embodiment of the invention, content providers 108A-N are given the opportunity to control, more directly, the user interfaces that portable device 102 generates and presents to viewers through displays 116A-N. In such an embodiment of the invention, the content distribution service operator bills such content providers a specified and agreed-upon amount of money in exchange for this opportunity to control portable device 102.

While a content provider's server is controlling portable device 102, the content provider's server may disable certain features of the portable device 102. For example, the content provider's server might disable the selection of an "advertisement-skipping" feature of portable device 102 for as long as the content provider's server is controlling portable device 102.

7.0 Hardware Overview

Figure 2:
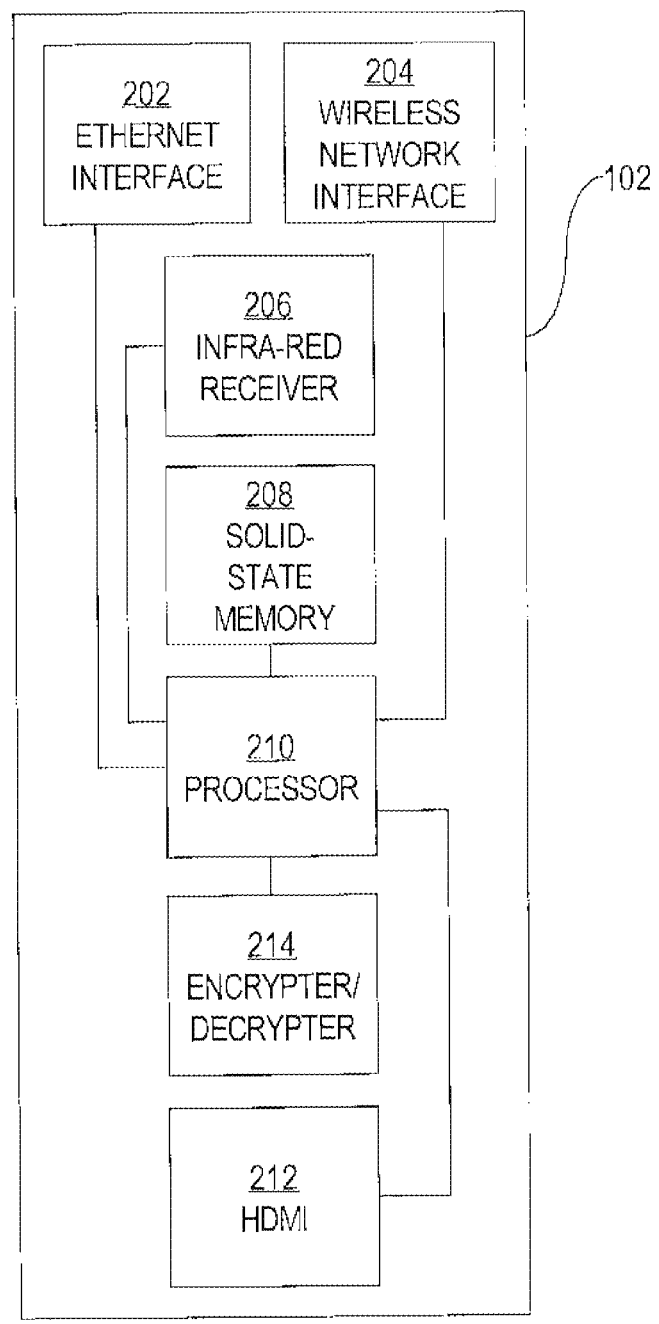
FIG. 2 is a block diagram that illustrates an example of the internal components of a transportable device, according to an embodiment of the invention.

FIG. 2 is a block diagram that illustrates an example of the internal components of portable device 102, according to an embodiment of the invention. In the embodiment illustrated, portable device 102 contains an Ethernet interface 202, a wireless network interface 204, an infra-red receiver 206, solid state memory 208, a processor 210, an encrypter/decrypter 214, and HDMI 212. The example device shown in FIG. 2 is but one of many possible different alternative embodiments of the invention; alternative embodiments of the invention may be implemented in alternative devices with fewer, greater, or different components than those illustrated in FIG. 2.

In one embodiment of the invention, portable device 102 comprises Ethernet interface 202 or wireless network interface 204, but not both. In another embodiment of the invention, portable device comprises both Ethernet interface 202 and wireless network interface 204. Portable device 102 is capable of communicating with content servers 110A-N, ad servers 114A-N, and HME server 104 over Internet 120 through Ethernet interface 202 and/or wireless network interface 204.

Infra-red receiver 206 is capable of receiving infra-red signals from a remote control. The remote control sends infra-red signals to portable device 102 in response to a user's manipulation of buttons on the remote control. The infra-red signals represent commands that the user wants portable device 102 to carry out. Circuitry within portable device 102 routes such commands in the form of electrical signals to processor 210. Processor 210 may be any microprocessor or application-specific integrated circuit (ASIC).

In one embodiment of the invention, when portable device 102 downloads content items and advertisements over Internet 120, portable device 102 stores those content items and advertisements, at least temporarily, within solid-state memory 208. In one embodiment of the invention, portable device 102 lacks any kind of hard disk drive, thereby reducing the weight, size, expense, and energy consumption of portable device 102. In one embodiment of the invention, portable device 102 runs on energy obtained from replaceable batteries. Processor 210 reads data from and writes data to solid-state memory 208.

Among other features, processor 210 is capable of receiving user interface commands from HME server 104 and generating television signals that represent user interfaces that conform to those commands. Processor 210 outputs such television signals to whichever one of displays 116A-N portable device 102 is currently connected through HDMI 212. HDMI 212 can be connected and disconnected repeatedly, at a user's discretion, from corresponding HDMIs on each of displays 116A-N.

Furthermore, in one embodiment of the invention, processor 210 is capable of decoding and uncompressing content items and advertisements that have been encoded and compressed (e.g., according to an MPEG or other encoding or compression standard). In one embodiment of the invention, processor 210 reads encoded and encrypted content items that are stored in solid-state memory 208, decodes and uncompresses those content items, and generates television signals that represent those content items. Processor 210 sends the generated television signals out through HDMI 212.

Although portable device 102 contains solid-state memory 208 in the embodiment of the invention illustrated in FIG. 2, in an alternative embodiment of the invention, portable device 102 lacks solid-state memory 208. In one embodiment of the invention, instead of storing content items and advertisements that portable device 102 downloads, portable device 102 streams such content items and advertisements directly through HDMI 212 as portable device 102 receives those content items and advertisements through interface 202 or interface 204.

In one embodiment of the invention, portable device 102 receives commands from a personal computer (not shown) over Internet 120 through interface 202 or interface 204. The commands instruct portable device 102 to perform specified operations. For example, such a command may instruct portable device 102 to download and store a particular content item. Thus, in one embodiment of the invention, portable device 102 can be controlled remotely over Internet 120, by an authorized device (e.g., an authorized Internet-connected laptop computer), in a manner similar to that in which that portable device 102 can be controlled more locally by the remote control discussed above. In one embodiment of the invention, a remote device sends (over Internet 120) such commands to HME server 104, which then sends corresponding commands to portable device 102 in order to cause portable device 102 to perform those commands.

In one embodiment of the invention, encrypter/decrypter 214 encrypts unencrypted signals into encrypted signals, and decrypts encrypted signals into unencrypted signals.

Figure 3:
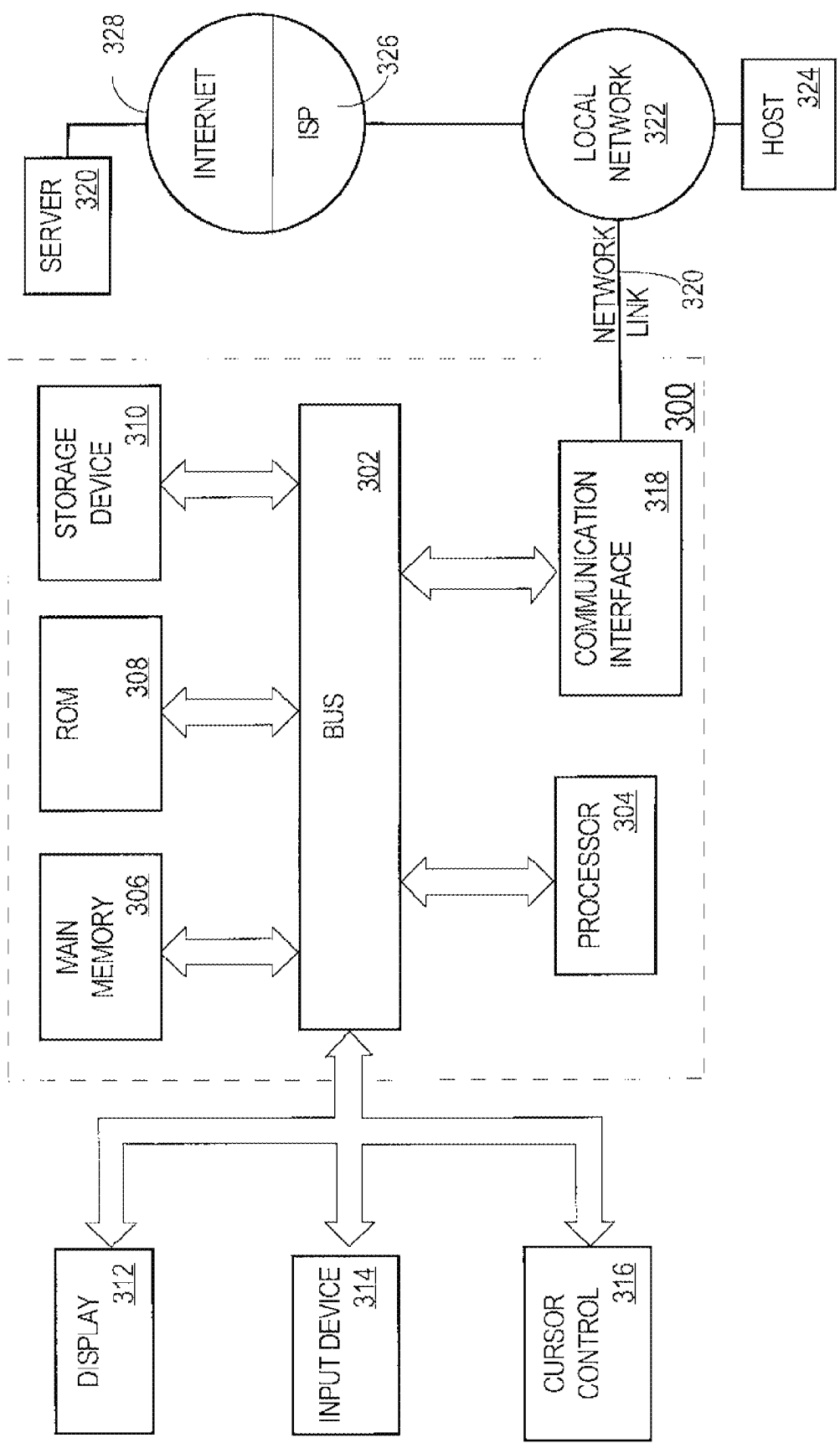
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for presenting supplemental content data and content data on a device, the device in communication with a system on a network,
   the system comprising:
   a plurality of content data servers to store the content data, wherein the content data is provided by a plurality of content data providers coupled to the network;
   a plurality of supplemental content data servers to store the supplemental content data, wherein the supplemental content data is provided by a plurality of supplemental content data providers coupled to the network;
   a metadata database to store first metadata that describes the content data, and that comprises one or more timepoints of the content data;
   a first server coupled to the metadata database to establish associations between the first metadata and the content data; and
   a second server to identify selected supplemental content data for presentation on the device at timepoints of the content data, wherein the supplemental content data is selected based on second metadata describing the supplemental content data and on the first metadata,
   the method comprising:
   requesting, by the device, requested content data to be displayed;
   receiving at the device from the second server, based on the requesting, prior to displaying the requested content data: (a) a content data uniform resource locator (URL) that identifies a third server of the plurality of content data servers, the third server storing the requested content data; (b) a supplemental content data URL that identifies a fourth server of the plurality of supplemental content data servers, the fourth server storing selected supplemental content data that was identified based on the requested content data, on the first metadata, and on the second metadata; and (c) a timepoint of the requested content data;
   requesting, by the device, based at least in part on the content data URL, the requested content data from the third server of the plurality of content data servers;
   receiving, by the device, from the third server, the requested content data based at least in part on the requesting of the requested content data;
   causing to be displayed, by the device, the requested content data;
   requesting, by the device, based at least in part on the supplemental content data URL, the selected supplemental content data from the fourth server of the plurality of supplemental content data servers, wherein a time for requesting the selected supplemental content data from the fourth server of the plurality of supplemental content data servers is based at least in part on the timepoint;

receiving, by the device, from the fourth server of the plurality of supplemental content data servers, the selected supplemental content data based at least in part on the requesting of the selected supplemental content data;

determining, by the device, that the timepoint has been reached during display of the requested content data;

based at least in part on determining that the timepoint has been reached, displaying, by the device, the selected supplemental content data; and resuming, on the device, the displaying of the requested content data following the displaying of the selected supplemental content data.

2. The method of claim 1, wherein the requested content data comprises a requested content item.

3. The method of claim 2, wherein the requested content item is at least one of a game, a movie, video content, or a song.

4. The method of claim 2, wherein the content data URL identifies the third server and the requested content item.

5. The method of claim 1, wherein the requested supplemental content data comprises a requested supplemental content item.

6. The method of claim 5, wherein the requested supplemental content item comprises an advertisement.

7. The method of claim 1, wherein receiving at the device from the second server, based on the requesting, prior to displaying the requested content data, further comprises receiving additional timepoints of the requested content data and additional selected supplemental content data.

8. The method of claim 7, further comprising
determining, by the device, that an additional timepoint of the additional timepoints has been reached during display of the requested content data;
based at least in part on determining that the additional timepoint has been reached, displaying, by the device, one of the additional selected supplemental content data; and
resuming, on the device, the displaying of the requested content data following the displaying of the additional selected supplemental content data.

9. The method of claim 1, wherein the requested supplemental content data is associated with a highest bid amount from a supplemental content data provider of the plurality of supplemental content data providers.

10. An apparatus for presenting supplemental content data and content data on the apparatus, the apparatus in communication with a system on a network,
the system comprising:
a plurality of content data servers to store the content data, wherein the content data is provided by a plurality of content data providers coupled to the network;
a plurality of supplemental content data servers to store the supplemental content data, wherein the supplemental content data is provided by a plurality of supplemental content data providers coupled to the network;
a metadata database to store first metadata that describes the content data, and that comprises one or more timepoints of the content data;
a first server coupled to the metadata database to establish associations between the first metadata and the content data; and
a second server to identify selected supplemental content data for presentation on the apparatus at timepoints of the content data, wherein the supplemental content data is selected based on second metadata describing the supplemental content data and on the first metadata,
the apparatus comprising:
control circuitry; and
at least one memory including computer program code for one or more programs, the at least one memory and the computer program code configured to, with the control circuitry, cause the apparatus to perform at least the following:
request requested content data to be displayed;
receive from the second server, based on the requesting, prior to displaying the requested content data: (a) a content data URL that identifies a third server of the plurality of content data servers, the third server storing the requested content data; (b) a supplemental content data URL that identifies a fourth server of the plurality of supplemental content data servers, the fourth server storing selected supplemental content data that was identified based on the requested content data, on the first metadata, and on the second metadata; and (c) a timepoint of the requested content data;
request the requested content data from the third server of the plurality of content data servers, based at least in part on the content data URL;
receive from the third server, the requested content data based at least in part on the requesting of the requested content data;
cause to be displayed the requested content data;
request the selected supplemental content data from the fourth server of the plurality of supplemental content data servers, based at least in part on the supplemental content data URL, wherein a time for requesting the selected supplemental content data from the fourth server of the plurality of supplemental content data servers is based at least in part on the timepoint;
receive from the fourth server of the plurality of supplemental content data servers, the selected supplemental content data based at least in part on the requesting of the selected supplemental content data;
determine that the timepoint has been reached during display of the requested content data;
display the selected supplemental content data, based at least in part on determining that the timepoint has been reached; and
resume the displaying of the requested content data following the displaying of the selected supplemental content data.

11. The apparatus of claim 10, wherein the requested content data comprises a requested content item.

12. The apparatus of claim 11, wherein the requested content item is at least one of a game, a movie, video content, or a song.

13. The apparatus of claim 11, wherein the content data URL identifies the third server and the requested content item.

14. The apparatus of claim 10, wherein the requested supplemental content data comprises a requested supplemental content item.

15. The apparatus of claim 10, wherein the apparatus is further caused when, receiving from the second server, based on the requesting, prior to displaying the requested content data, to receive additional timepoints of the requested content data and additional selected supplemental content data.

16. The apparatus of claim 15, wherein the apparatus is further caused to:
   determine that an additional timepoint of the additional timepoints has been reached during display of the requested content data;
   display one of the additional selected supplemental content data based at least in part on determining that the additional timepoint has been reached; and
   resume display of the requested content data following the displaying of the additional selected supplemental content data.

17. The apparatus of claim 10, wherein the requested supplemental content data is associated with a highest bid amount from a supplemental content data provider of the plurality of supplemental content data providers.

18. A non-transitory computer-readable medium having instructions encoded thereon that, when executed by control circuitry, cause the control circuitry to:
   communicate with a system, the system comprising:
      a plurality of content data servers to store content data, wherein the content data is provided by a plurality of content data providers coupled to a network;
      a plurality of supplemental content data servers to store supplemental content data, wherein the supplemental content data is provided by a plurality of supplemental content data providers coupled to the network;
      a metadata database to store first metadata that describes the content data, and that comprises one or more timepoints of the content data;
      a first server coupled to the metadata database to establish associations between the first metadata and the content data; and
      a second server to identify selected supplemental content data for presentation on an apparatus at timepoints of the content data, wherein the supplemental content data is selected based on second metadata describing the supplemental content data and on the first metadata,
   request requested content data to be displayed;
   receive from the second server, based on the requesting, prior to displaying the requested content data: (a) a content data URL that identifies a third server of the plurality of content data servers, the third server storing the requested content data; (b) a supplemental content data URL that identifies a fourth server of the plurality of supplemental content data servers, the fourth server storing selected supplemental content data that was identified based on the requested content data, on the first metadata, and on the second metadata; and (c) a timepoint of the requested content data;
   request the requested content data from the third server of the plurality of content data servers, based at least in part on the content data URL;
   receive from the third server, the requested content data based at least in part on the requesting of the requested content data;
   cause to be displayed the requested content data;
   request the selected supplemental content data from the fourth server of the plurality of supplemental content data servers, based at least in part on the supplemental content data URL, wherein a time for requesting the selected supplemental content data from the fourth server of the plurality of supplemental content data servers is based at least in part on the timepoint;
   receive from the fourth server of the plurality of supplemental content data servers, the selected supplemental content data based at least in part on the requesting of the selected supplemental content data;
   determine that the timepoint has been reached during display of the requested content data;
   display the selected supplemental content data, based at least in part on determining that the timepoint has been reached; and
   resume the displaying of the requested content data following the displaying of the selected supplemental content data.

* * * * *